K. GNAD.
MACHINE FOR CUTTING TILES.
APPLICATION FILED NOV. 27, 1907.
1,067,421. Patented July 15, 1913.
4 SHEETS—SHEET 1.
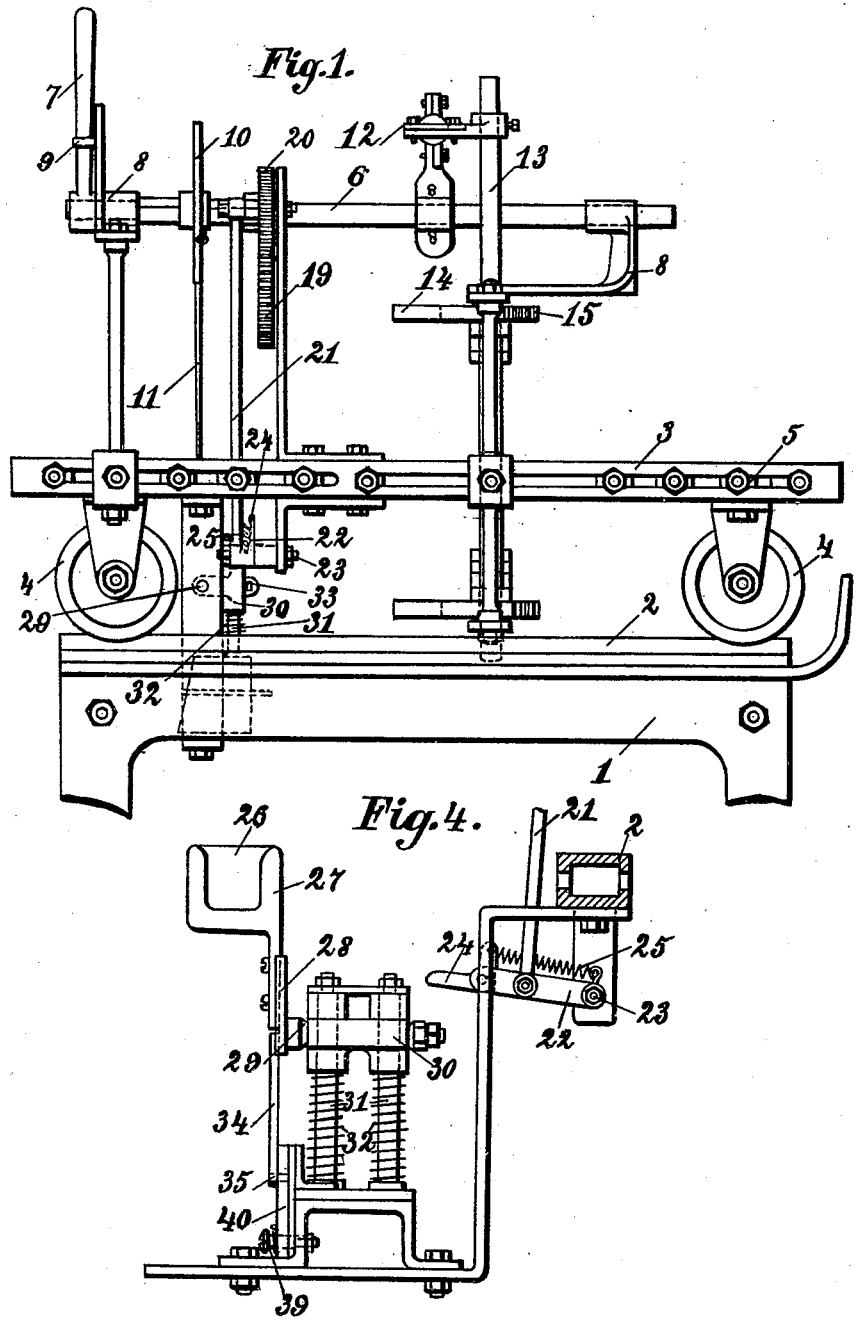
Witnesses: Paul Grauer, Christian Sterger
Inventor
Karl Gnad

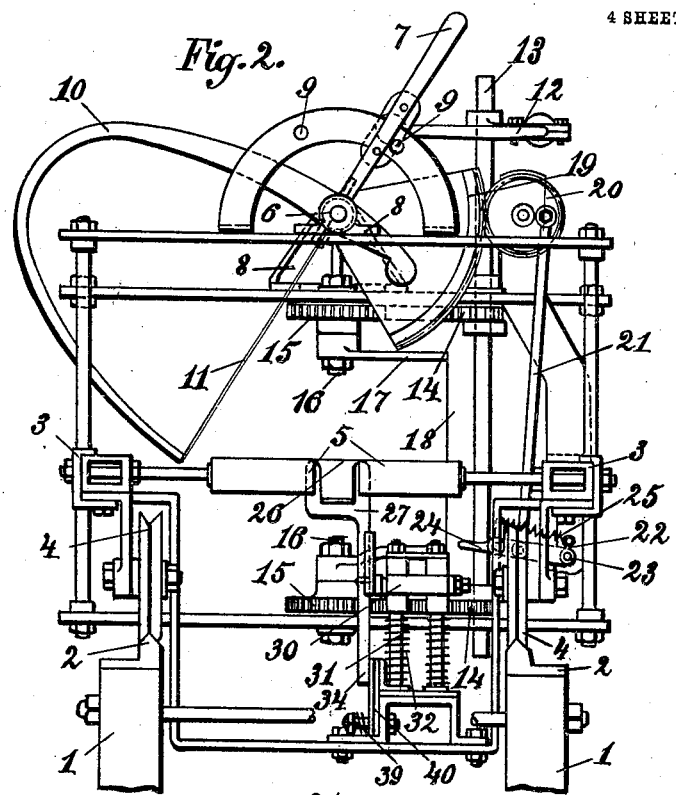
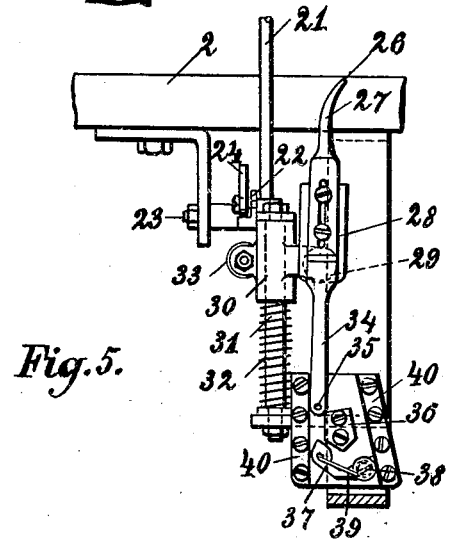

K. GNAD.
MACHINE FOR CUTTING TILES.
APPLICATION FILED NOV. 27, 1907.

1,067,421.

Patented July 15, 1913.

4 SHEETS—SHEET 3.

Witnesses:
Paul Grauer
Christian Staiger

Inventor:
Karl Gnad

K. GNAD.
MACHINE FOR CUTTING TILES.
APPLICATION FILED NOV. 27, 1907.
1,067,421.
Patented July 15, 1913.
4 SHEETS—SHEET 4.
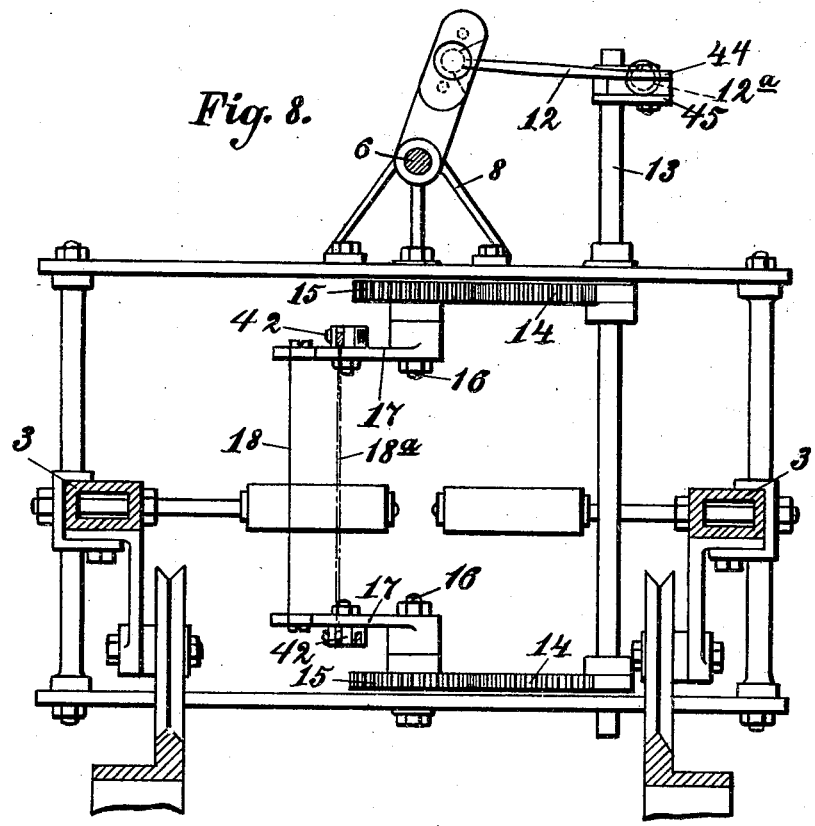
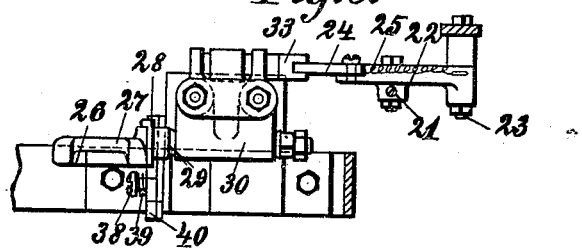
Witnesses:
Inventor:

UNITED STATES PATENT OFFICE.

KARL GNAD, OF WAIBLINGEN, GERMANY.

MACHINE FOR CUTTING TILES.

1,067,421.  Specification of Letters Patent.  Patented July 15, 1913.

Application filed November 27, 1907. Serial No. 404,024.

*To all whom it may concern:*

Be it known that I, KARL GNAD, engineer, a subject of the King of Wurttemberg and German Emperor, residing at Schützenstrasse 1, Waiblingen, in the Kingdom of Wurttemberg and Empire of Germany, have invented certain new and useful Improvements in Machines for Cutting Tiles, of which the following is a specification.

The present invention refers to a device for cutting off tiles by means of which the known roofing tiles with lugs can be cut off, so that the tiles are manufactured with the lug downward, the novel feature of the invention consisting in this lug on the under surface of the tile being cut at the front end of the tile considered from the direction of travel of the tiles. This represents a considerable advantage as the lug may be better observed in front so that it is not damaged while the tile is being removed. In the machines employed until now with the lug strip on the under surface of the stream of clay the lug was liable to be damaged as it was made at the back end of the tile and was thus not visible. The cutting off device according to the present invention further is remarkable for its great capacity which is obtained by means of a peculiar lug cutting arrangement. This consists essentially in the lug cutting wire being returned automatically and positively into the initial position after a tile has been cut off, so that it is impossible for the stream of clay to be cut inadvertently and no waste is produced. Further by a further arrangement of the device cutting the front end of the tile not only segment shaped tiles but also semicircular tiles of various widths can be made. This is obtained by besides the detachable wire for cutting segment shaped tiles another wire for cutting semicircular tiles being employed, which latter wire is adjustable together with its gear. The wire can be made adjustable either in front or behind its swiveling point so that it traverses circular paths according to the width of the respective stream of clay. Also the wire itself may be so far adjusted that it may be used for cutting off segment shaped tiles.

The new machine is shown in the accompanying drawings in which—

Figure 3:
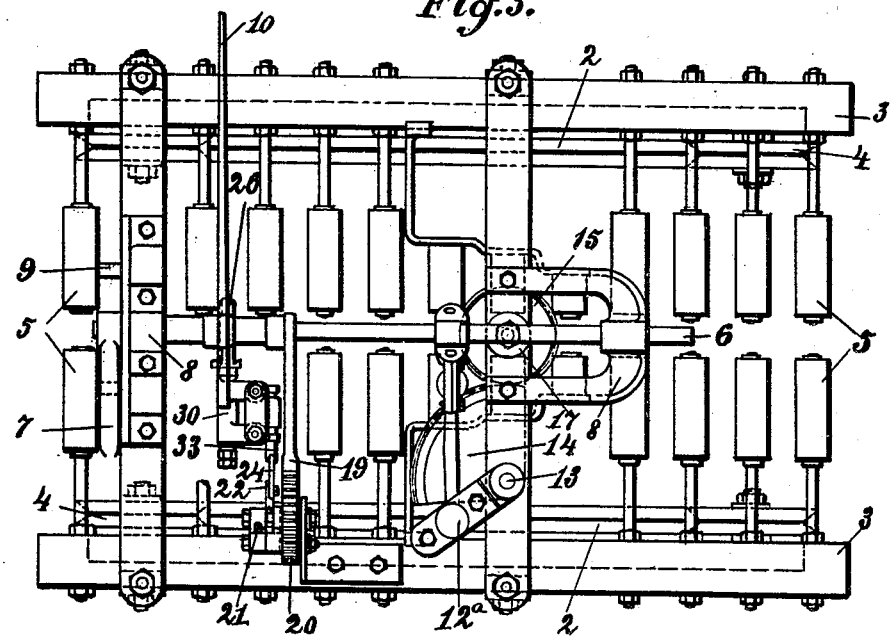

Figure 1 is a side elevation, Fig. 2 a front elevation, Fig. 3 a plan. Fig. 4 a front elevation of the lug cutting device and its controlling gear, Fig. 5 a side elevation of the same, Fig. 6 a plan of the same, Fig. 7 being a plan of a modification of the device cutting the front edge of the tile for cutting segment shaped tiles. Fig. 8 a front elevation of the same.

On the frame —1— is arranged the truck —3— traveling in known manner with wheels —4— on rails —2— and carrying the loosely rotatable rollers —5— serving as path for the stream of clay.

The cutting off of the tiles is effected from a driving spindle —6— horizontally and rotatably arranged in bearings —8— on the frame. On said spindle —6— is fitted a hand lever —7— by means of which the cutting off of the tiles from the stream of clay and the cutting to size is effected in one operation.

For cutting the straight end of the tile, which according to the present invention lies in front considered from the direction of travel of the clay, serves a cutting wire —11—, which is arranged over a hoop —10—, fitted on spindle —6—, if therefore the lever —7—, the two extreme positions of which are controlled by pins —9—, is turned over, the wire —11— will cut off the stream of clay in a straight line.

For cutting the lug of the tile a toothed segment —19— is fitted on spindle —6—, said segment engaging with a toothed wheel —20—. The latter acts as crank disk and is coupled by means of connecting rod —21— with a lever —22— swiveling on bolt —23—, Fig. 4, said lever having a swiveling pawl —24— at its free end, which is under action of spring —25—. This pawl acts while moving downward as driver on a stop —33— provided on a vertically moving slide —30—. This slide is guided on rods —31— and is under action of spring —32— which tend to force it upward. By the downward motion of the slide —30— also the lug cutting wire —26— is brought down and drawn out of the stream of clay, for which purpose the hoop —27— of the cutting wire —26— is carried by a spindle —29— rotatably arranged in the guide piece —30—. The wire —26— and its hoop —27— are according to the present invention geared in such a manner that the wire immediately after emerging from the clay will leave the lug free at the length required, then again enter the clay and be returned by the stream to its original position. This gearing is effected by means of a switch, which consists of the two lateral guide rails —40—, Fig. 5, and the core piece —36—. In this switch a stud —35— moves, fitted to a downward arm —34— of hoop —27—. If now the guide piece —30— is moved downward, that is the lug cutting wire —26— drawn out of the clay, the stud —35— will first move in the vertical part of the slot formed by the rails —40— until it strikes against tongue —37—. The latter swivels on a pin —38— and is under action of a spring —39— which continuously forces it upward. Said tongue —37— is turned by pin —35— when the wire —26— moves downward and will tend to turn the hoop —27— with the arm —23— around the spindle —29—, that is the pin —35— will be forced around the point of the core piece —36— whereby pin —35— is prevented from returning into the same branch of the switch. During its upward motion caused by the springs —32— the wire —26— will enter into the continuously advancing stream of clay and is carried along by the same, whereby the hoop —27— returns into its original vertical position. In order to also dress the front edge of the tile in the desired manner, say in a circular line, the driving spindle —6— is coupled with a vertical spindle —13— by means of a ball and socket joint —12— by means of which the spindle —13— is likewise rotated. On said spindle —13— are arranged above and below the stream of clay segments —14— which engage with gear wheel —15— the spindles —16— of which lie in the central line of the stream of clay. On spindles —16— are fitted levers —17— over which the wire —18— is drawn for cutting the front edge of the tile, which considered from the direction of travel lies behind.

Figure 7:
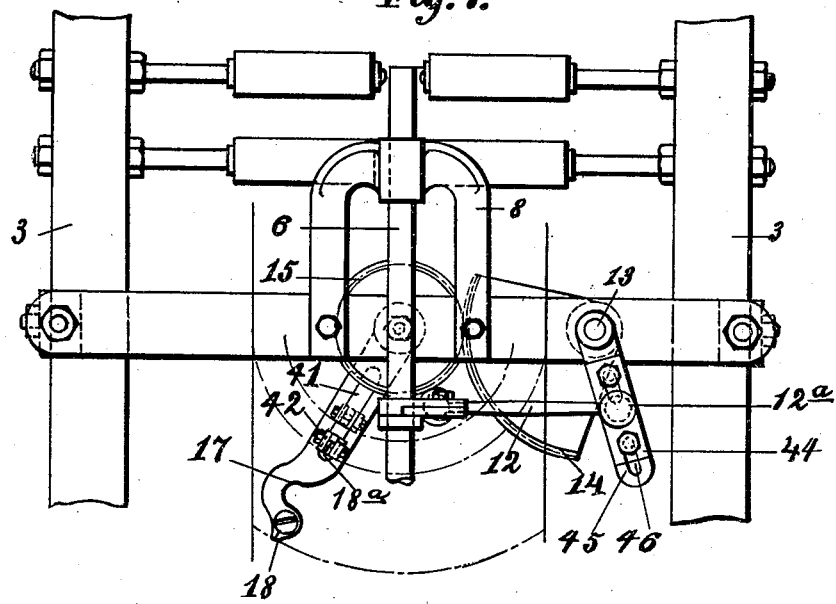

The wire —18— is hereby used when tile with segment shaped outline are to be cut and is detachably held by screws or the like, so that it can be conveniently removed. For cutting semicircular tiles the wire —18ª— is employed which can be adjusted according to the present invention. For this purpose it is held at its ends by a clamping arrangement —2— which can by means of levers —17— be approached along a radial slot —1— to the center as may be required so that circular curves of various diameters may be produced, Fig. 7. Hereby it is necessary to adjust the gear of the wires —18— or —18ª— so as to obtain a different stroke of the cranks —17—. For this purpose the ball and socket joint —12—, Figs. 7 and 8, is adjustable, by its ball —12ª— being arranged in a slide —4—, which may be adjusted on lever —5— say by means of slots —8—.

The cutting arrangement acts as follows: When the stream of clay is cut through by means of the handle —7— also the front end of the tile is cut in known manner as may be required with a circular point or the like. At the same time the lug cutting wire is drawn out of the clay and immediately returned into initial working position by means of the switch —36—40— that is brought into contact with the clay where the lug ceases so that the work may be continuously continued without any loss of time or waste of material.

Having now described my invention what I claim and desire to secure by Letters Patent of the United States is:

1. A machine for cutting roofing tiles comprising a carriage, a shaft horizontally mounted on said carriage, a handle for oscillating said shaft mounted thereon, a straight cutter keyed to said shaft so as to be oscillated in a plane vertical to said shaft, a spring-actuated stub-cutter vertically guided on said carriage and normally held in raised or cutting position, means connected to said shaft and adapted to move down said stub-cutter, a cutting-wire vertically arranged and adapted to cut the front edge of the tile, means for connecting said cutting-wire to said shaft, and a suitable track mounted on a table and adapted for supporting said carriage so as to permit the carriage to be driven by means of the stream of clay passing out the press, substantially as set forth.

2. A machine for cutting roofing tiles, comprising a carriage, a shaft mounted lengthwise above the middle of said carriage, a handle attached to the inner end of said shaft and adapted for oscillating said shaft, stops fitted to said carriage and adapted to form abutments of said handle, a straight cutter keyed with one end of its hoop to said shaft, a swiveling pawl pivotally attached to the end of a lever being pivoted to said carriage, a toothed segment keyed to said shaft and engaging a geared crank disk for moving said pawl in a vertical plane, a stub-cutter pivoted to a spring-actuated piece vertically guided in said carriage and normally held in raised or cutting position, a stop attached to said stub-cutter and adapted to be engaged by said pawl if being lowered, a V shaped switch attached to said carriage and adapted for guiding a stud of said stub-cutter, a front cutter adapted for suitably shaping the curved front edge of the tile, said front cutter having a cutting-wire vertically put into the ends of levers keyed to short axles being journaled in the carriage and driven from said shaft, and a suitable track mounted on a table and adapted for supporting said carriage so as to permit the carriage and the stream of clay to advance uniformly, substantially as set forth.

In testimony whereof I have hereunto set my hand in the presence of two witnesses.

KARL GNAD.

Witnesses:
ERNST ENTENMANN,
ANNA HUBER.